United States Patent
Liu

(10) Patent No.: US 7,115,083 B2
(45) Date of Patent: Oct. 3, 2006

(54) CUTTING TOOL HOLDER FOR A MACHINING CENTER

(75) Inventor: Hsin-Jun Liu, Tantzu Hsiang (TW)

(73) Assignee: New GIFU Enterprise Co., Ltd., Taichung Hsien (TW)

( * ) Notice: Subject to any disclaimer, the term of this patent is extended or adjusted under 35 U.S.C. 154(b) by 171 days.

(21) Appl. No.: 10/952,348

(22) Filed: Sep. 27, 2004

(65) Prior Publication Data

US 2006/0065096 A1    Mar. 30, 2006

(51) Int. Cl.
*B23B 31/02* (2006.01)
*B26D 7/26* (2006.01)

(52) U.S. Cl. ................................ 483/65; 83/698.41

(58) Field of Classification Search ............. 83/698.31, 83/698.41, 698.91; 483/39, 19, 24, 31, 32, 483/902, 65
See application file for complete search history.

(56) References Cited

U.S. PATENT DOCUMENTS

| | | | | |
|---|---|---|---|---|
| 3,640,397 A | * | 2/1972 | Ollearo | 483/31 |
| 4,720,221 A | * | 1/1988 | Yoshioka et al. | 409/233 |
| 4,777,715 A | * | 10/1988 | Roberts | 483/30 |
| 5,046,233 A | * | 9/1991 | Shoda | 483/32 |
| 5,542,899 A | * | 8/1996 | Yamada et al. | 483/32 |
| 5,704,885 A | * | 1/1998 | Lee | 483/62 |
| 6,149,562 A | * | 11/2000 | Patel et al. | 483/13 |
| 6,428,454 B1 | * | 8/2002 | Yokota et al. | 483/68 |
| 6,467,145 B1 | * | 10/2002 | Porta | 29/40 |
| 6,620,083 B1 | * | 9/2003 | Ninomiya et al. | 483/65 |

* cited by examiner

*Primary Examiner*—Charles Goodman
(74) *Attorney, Agent, or Firm*—patenttm.us; James H. Walters

(57) ABSTRACT

A cutting tool holder for a machining center has a body and a fastening device. The fastening device is mounted in the body and has a base, at least two positioning elements and a locking element. The base has an annular wall, a through hole and at least two positioning holes. The through hole is formed through the base. The at least two positioning holes are formed in the annular wall and correspond to the through hole. The at least two positioning elements are located in the at least two positioning holes and engage an annular recess of a seat for a cutting tool to securely yet releasably retain the seat in the base. The locking element is mounted around the base to keep the at least two positioning elements from escaping the at least two positioning holes.

5 Claims, 11 Drawing Sheets

CUTTING TOOL HOLDER FOR A MACHINING CENTER

BACKGROUND OF THE INVENTION

1. Field of the Invention

The present invention relates to a cutting tool holder, especially to a cutting tool holder for a machining center.

2. Description of the Prior Arts

A machining center is a kind of machine that can perform cutting, drilling, boring, scraping steps etc. With reference to FIG. 7, a machining center comprises a circular tool rack (50). The circular tool rack (50) has multiple first conventional cutting tool holders (51). The cutting tool holders (51) are mounted around the circular tool rack (50). When the circular tool rack (50) is rotated, the location of the cutting tool holders (51) is accordingly changed. With further reference to FIG. 8, each cutting tool holder (51) has a conical bore (511), a proximal end, a wall, a through hole (510), four screw holes (512) and four fastening devices (55). The through hole (510) is in communication with the conical bore (511) and extends to the proximal end of the cutting tool holder (51). A diameter of the conical bore at a distal end of the tool holder (51) is larger than a diameter of the through hole (510) in the proximal end. The screw holes (512) are formed through the wall, are near the proximal end of the cutting holder (51) and perpendicularly correspond to the through hole (510). The fastening devices (55) are respectively mounted in the screw holes (512) and each has a ball bearing (551), a spring (552) and a screw bolt (553). The ball bearing (551) is mounted in the screw hole (512) and protrudes to the through hole (511). The spring (552) is mounted in the screw hole (512) and presses against the ball bearing (551). The screw bolt (553) is mounted in the screw hole (512) to keep the spring (552) and the ball bearing (551) from escaping the screw hole (512). A cutting tool (61) is mounted on a seat (60). The seat (60) has a proximal end, a distal end and an annular recess (601). A diameter of the proximal end of the seat (60) is larger than a diameter of the distal end of the seat (60). The annular recess (601) is formed around the seat (60) near the distal end. The seat (60) is inserted in the through hole (511) and the annular recess (601) receives the ball bearings (551). Because the springs (552) press against the ball bearings (551), the fastening device (55) can securely retain the seat (60).

With further reference to FIG. 9, a different kind of cutting tool holder (51') is needed to correspond to the different kind of seat (60'). If the annular recess (601) is formed on the seat (60') at a different location, the location of the screw holes (512) on the holder (51') has to be changed. However, drilling the screw holes (512) through the wall and forming the thread are difficult operations.

With reference to FIGS. 10 and 11, a second conventional cutting tool holder (70) comprises a through hole (71) and a fastening device (80). The through hole (71) is formed through the cutting tool holder (70). The fastening device (80) is mounted in the through hole (71) and has a central hole, four conical holes (81), four ball bearings (82) and four springs (83). The conical holes (81) are formed through the fastening device (80) and correspond to the central hole. The ball bearings (82) are respectively mounted in the conical holes (81). The springs (83) are respectively mounted in the conical holes (81) and press against the ball bearings (82). Although the fastening device (80) of the second conventional cutting tool holder (70) does not require the thread, the second conventional cutting holder (70) still has numerous shortcomings. Because the springs (83) easily escape from the holes (81), it is difficult for the fastening device (80) to be mounted in and dismounted from the through hole (71) of the cutting tool holder (70). The ball bearings (82) and the springs (83) are easily lost when changing the fastening device (80).

To overcome the shortcomings, the present invention provides a cutting tool holder for a machining center to mitigate or obviate the aforementioned problems.

SUMMARY OF THE INVENTION

The main objective of the present invention is to provide a cutting tool holder that is easy to change and assemble.

A cutting tool holder for a machining center in accordance with the present invention comprises a body and a fastening device. The fastening device is mounted in the body and has a base, at least two positioning elements and a locking element. The base has an annular wall, a through hole and at least two positioning holes. The through hole is formed through the base. The at least two positioning holes are formed in the annular wall and correspond to the through hole. The at least two positioning elements are respectively located in the at least two positioning holes and engage an annular recess of a seat for a cutting tool to securely yet releasably retain the seat. The locking element is mounted around the base to keep the at least two positioning elements from escaping the at least two positioning holes.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
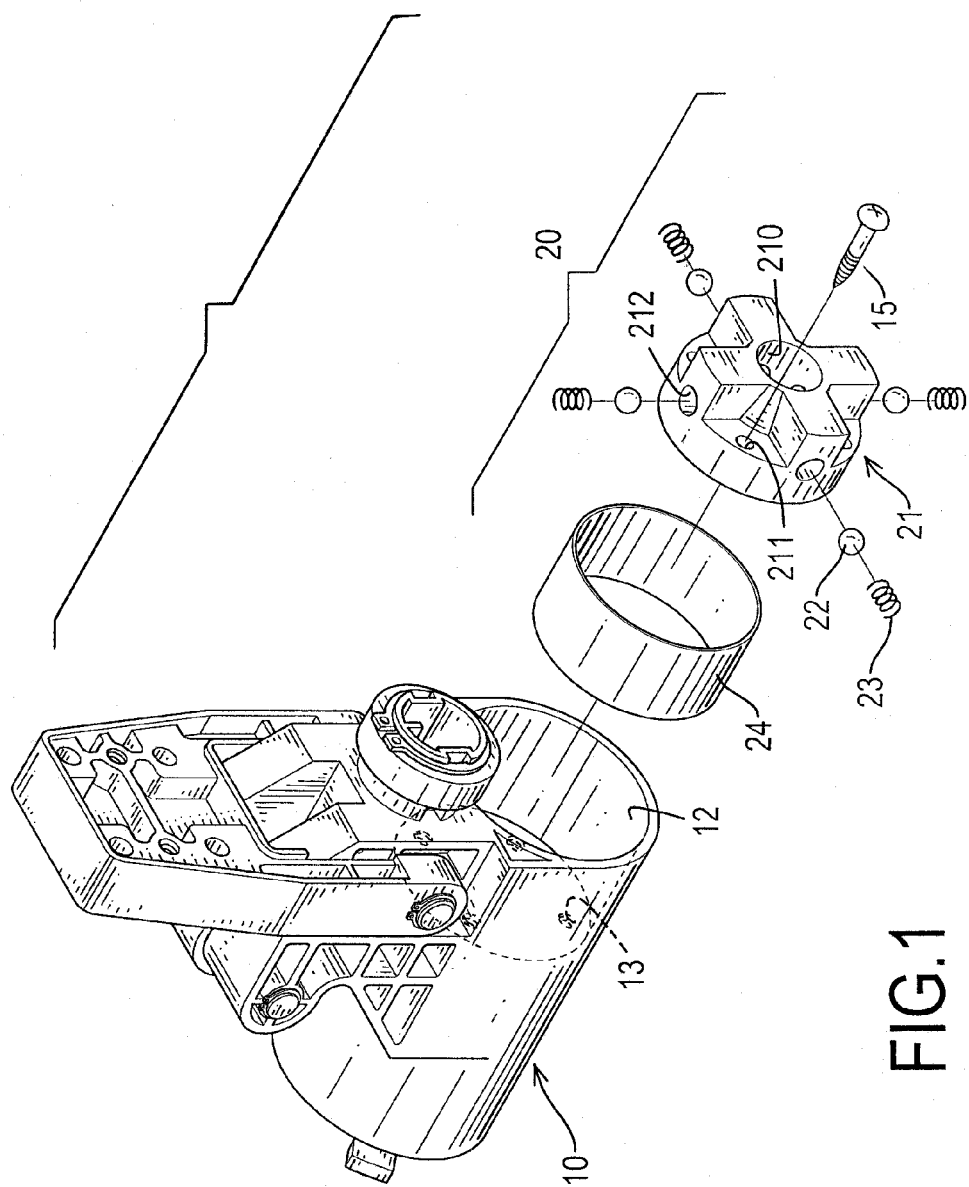
FIG. 1 is an exploded perspective view of a cutting tool holder for a machining center in accordance with the present invention.
Figure 2:
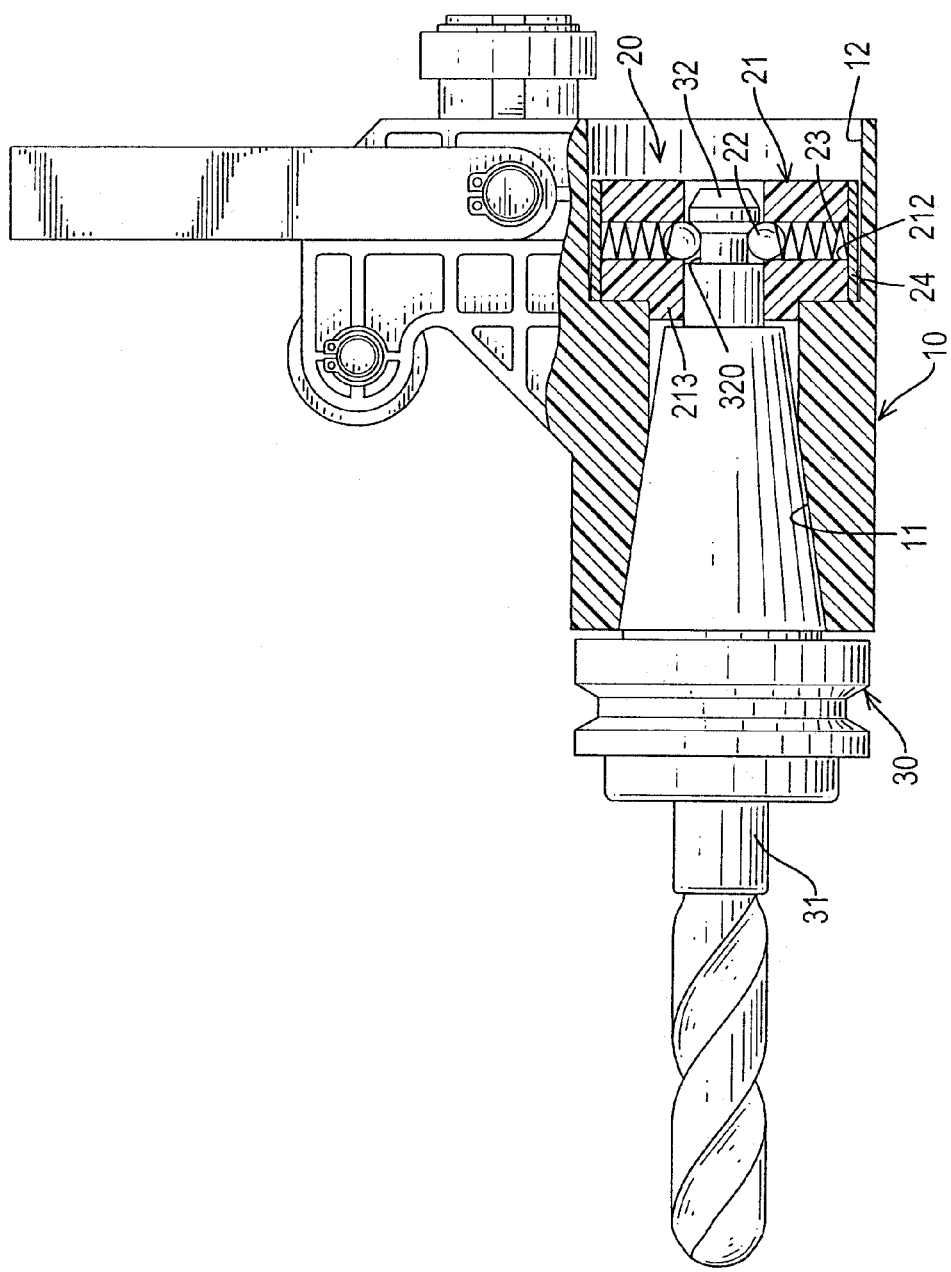
FIG. 2 is a side view in partial section of the cutting tool holder in FIG. 1 with a cutting tool.
Figure 3:
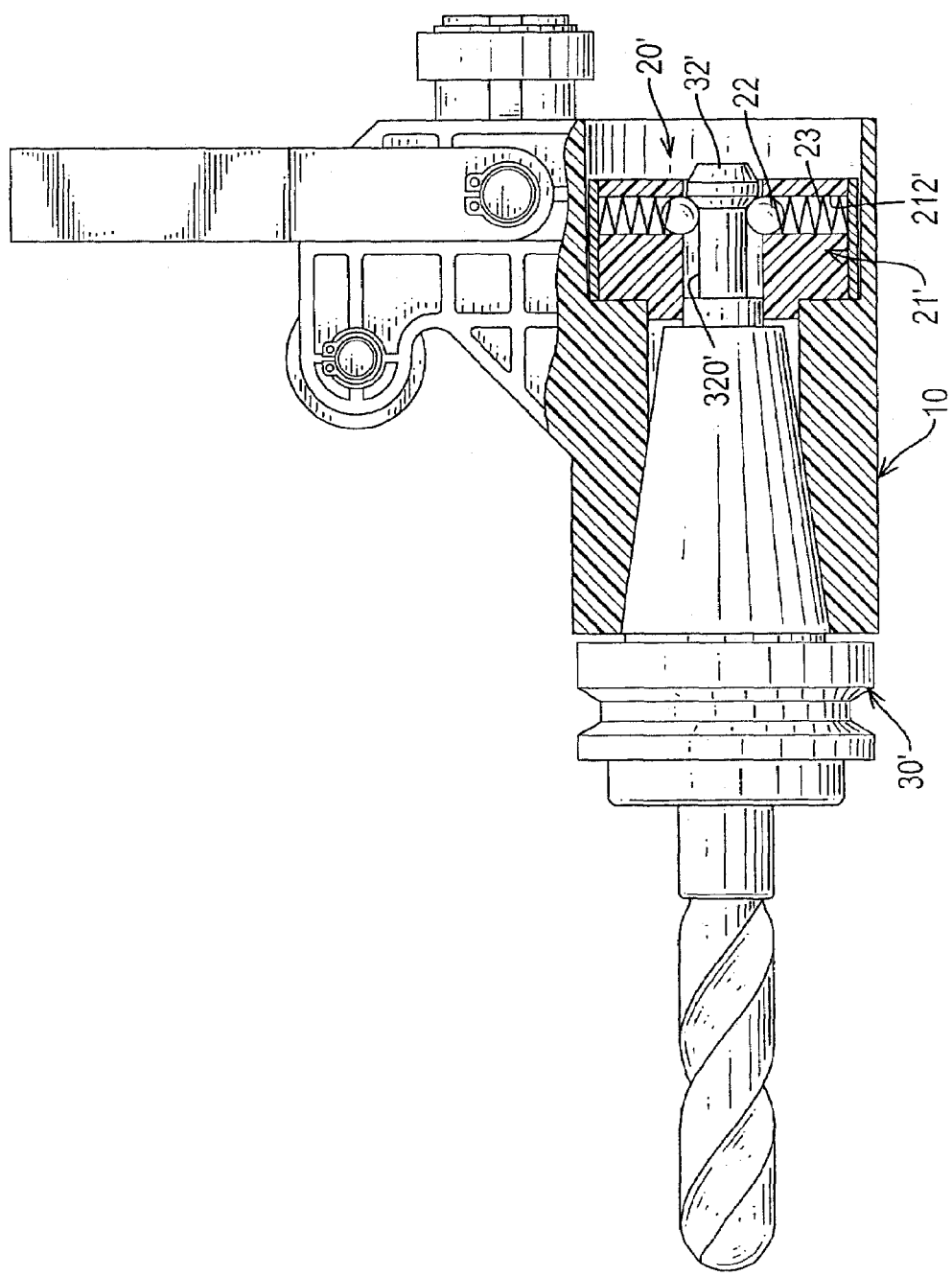
FIG. 3 is a side view in partial section of another cutting tool holder in accordance with the present invention with a cutting tool.

With reference to FIGS. 1 and 2, a cutting tool holder for a machining center in accordance with the present invention comprises a body (10) and a fastening device (20). A cutting tool (31) is mounted on a seat (30). The seat (30) has a proximal end, a distal end (32) and an annular recess (320). The annular recess (320) is formed around the seat (30) near the distal end (32).

The body (10) has a proximal end, a distal end, a conical hole (11), a containing recess (12) and multiple screw holes (13). The conical hole (11) is formed in the proximal end and has an opening and a bottom. The diameter of the conical hole (11) tapers smaller from the opening to the bottom. The distal end of the seat (30) for the cutting tool (31) is located in the conical hole (11). The containing recess (12) is formed in the distal end, corresponds to the conical hole (11) and has a bottom. The diameter of the bottom of the containing recess (12) is larger than the diameter of the bottom of the conical hole (11). The screw holes (13) are formed in the bottom of the containing recess (12).

The fastening device (20) is mounted in the containing recess (12) and has a base (21), at least two positioning elements and a locking element. The base (21) comprises an inner surface, an outer surface, an annular wall, a through hole (210), multiple fastening holes (211), multiple fasteners (15), at least two positioning holes (212) and an optional annular protrusion (213). The through hole (210) is formed through the base (21). The fastening holes (211) are formed around the through hole (210) through the base (21). The fasteners (15) respectively extend into the fastening holes (211) and the screw holes (13) to hold the base (21) and the body (10) together. The at least two positioning holes (212) are formed in the annular wall, extend to the through hole (210) and each of the at least two positioning holes (212) has an inner opening and an outer opening. The annular protrusion (213) is formed on the inner surface around the through hole (210) in the base (21) and protrudes to the conical hole (11) in the body (10). The at least two positioning elements are located in the positioning holes (212) and engage the annular recess (320) of the seat (30) of the cutting tool. The locking element is mounted around the base (21) and holds the at least two positioning elements in position.

In a first and second embodiment of the cutting tool container in accordance with the present invention, the at least two positioning holes in the base (21) are four positioning holes (212, 212'), the at least two positioning elements are four ball bearings (22) and four springs (23) and the locking element is a circular cover (24). The diameter of the inner opening of the positioning holes (212, 212') is smaller than the diameter of the outer opening of the positioning holes (212, 212'). The ball bearings (22) are located in the positioning holes (212, 212') and engage the annular recess (320, 320') of the seat (30) to securely yet releasably retain the seat (30) in the positioning element (20). The springs (23) are respectively located in the positioning holes (212, 212') and press against the ball bearings (22). The circular cover (24) is mounted around the base (21) to keep the ball bearings (22) and the springs (23) from escaping the positioning holes (212, 212').

Figure 4:
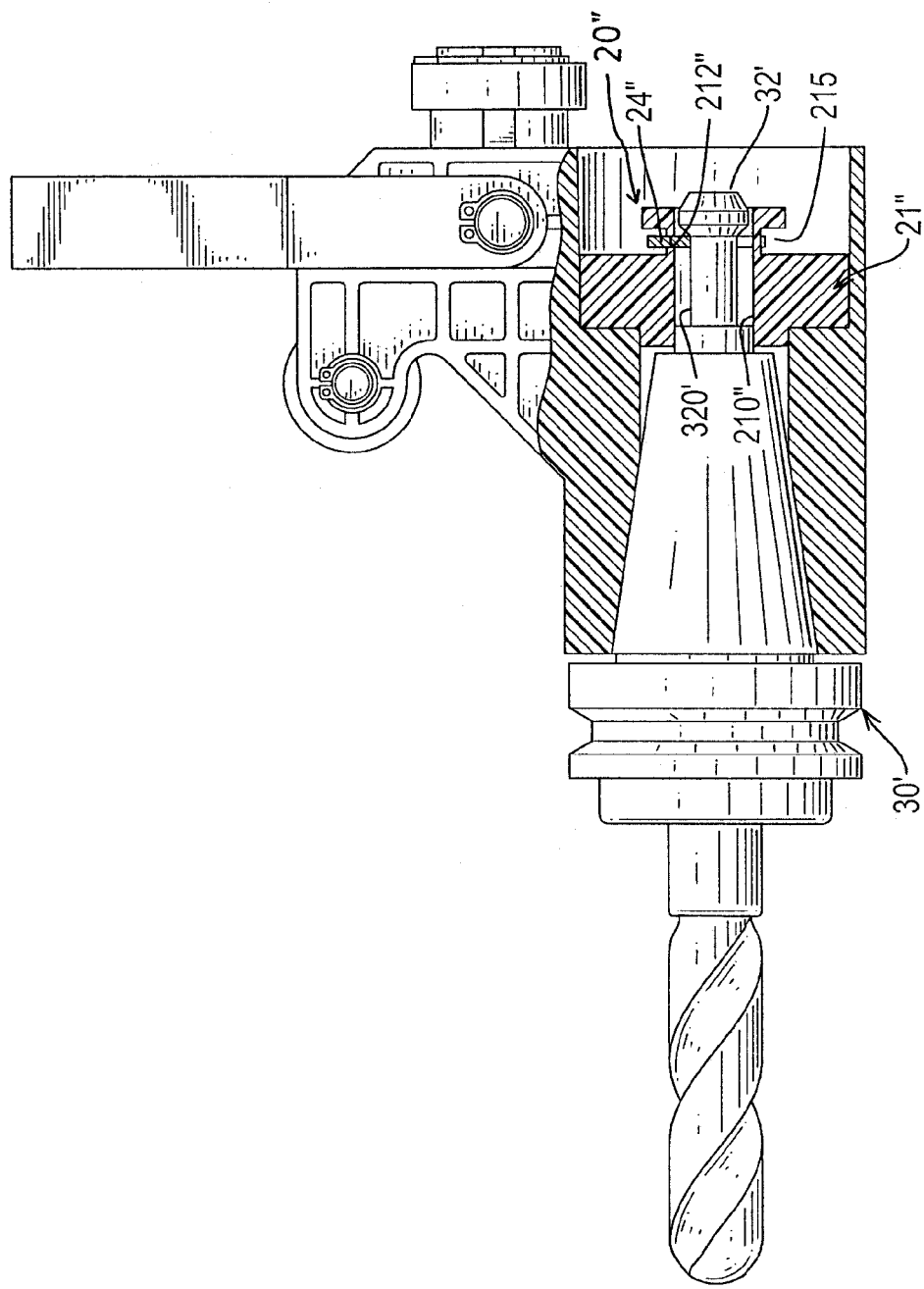
FIG. 4 is a side view in partial section of another cutting tool holder in accordance with the present invention with a cutting tool.
Figure 5:
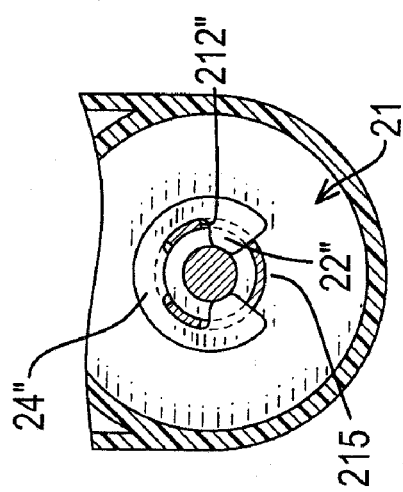
FIG. 5 is a rear view in partial section of the cutting tool holder in FIG. 4.

With further reference to FIGS. 4 and 5, in a third embodiment of the cutting tool container in accordance with the present invention, the base (21") further comprises an annular recess (215), the locking element is a C-clip (24") and the at least two positioning elements are two protrusions (22"). The annular recess (215) is formed around the base (21") and corresponds to the positioning holes (212"). The C-clip (24") is located in the annular recess (215) and has two ends. The protrusions (22") are respectively formed on the two ends of the C-clip (24"), protrude in the positioning holes (212") and engage the annular recess (320, 320') of the seat (30) to securely yet releasably retain the seat (30) in the fastening device.

Figure 6:
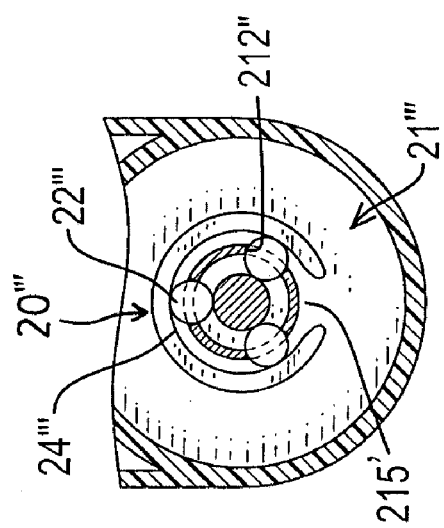
FIG. 6 is a rear view in partial section of another cutting tool holder in accordance with the present invention.
Figure 7:
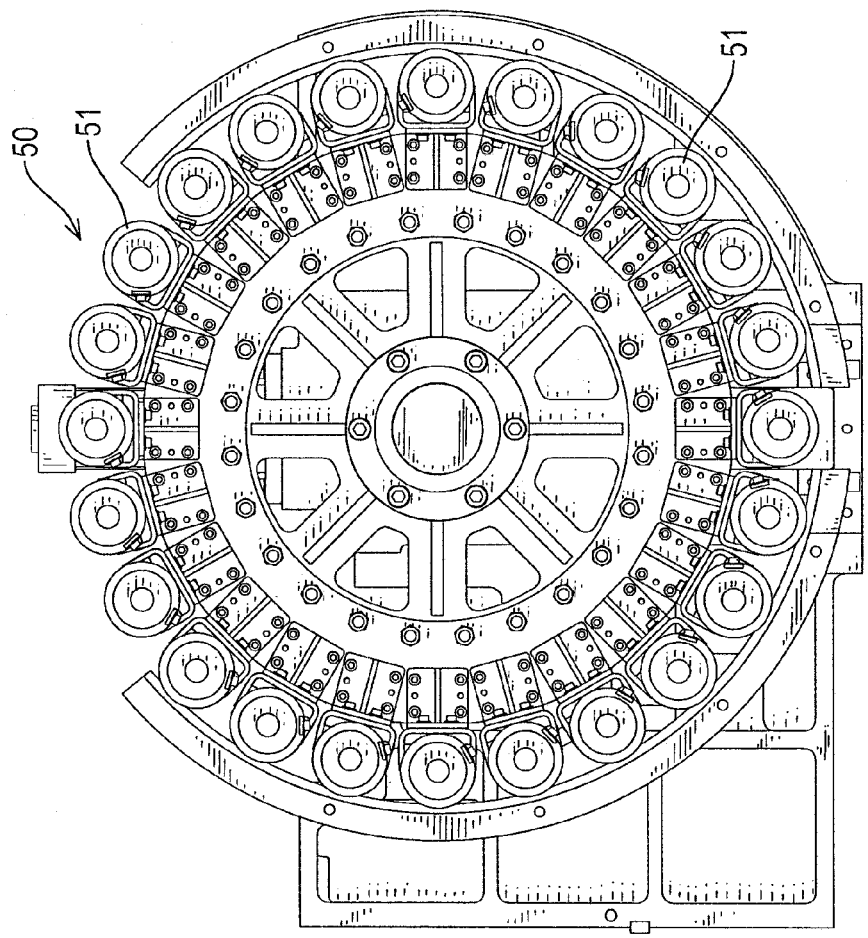
FIG. 7 is a front view of multiple conventional cutting tool holders of a circular tool rack of a machining center in accordance with the prior art.
Figure 8:
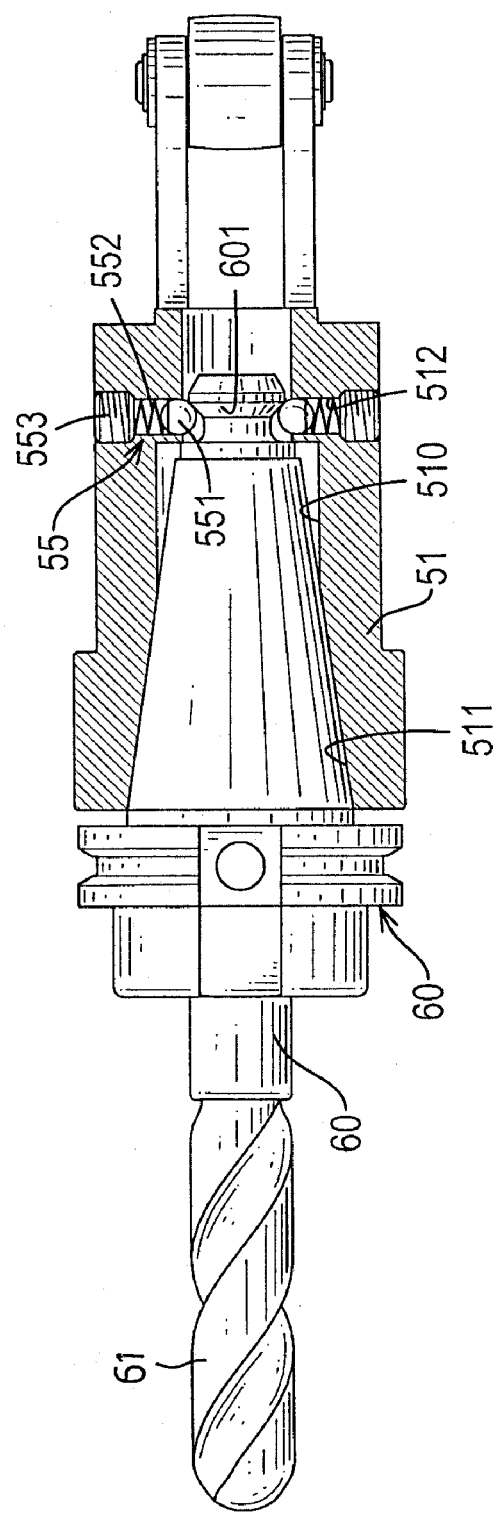
FIG. 8 is a side view in partial section of the conventional cutting tool holder in FIG. 7 with a cutting tool.
Figure 9:
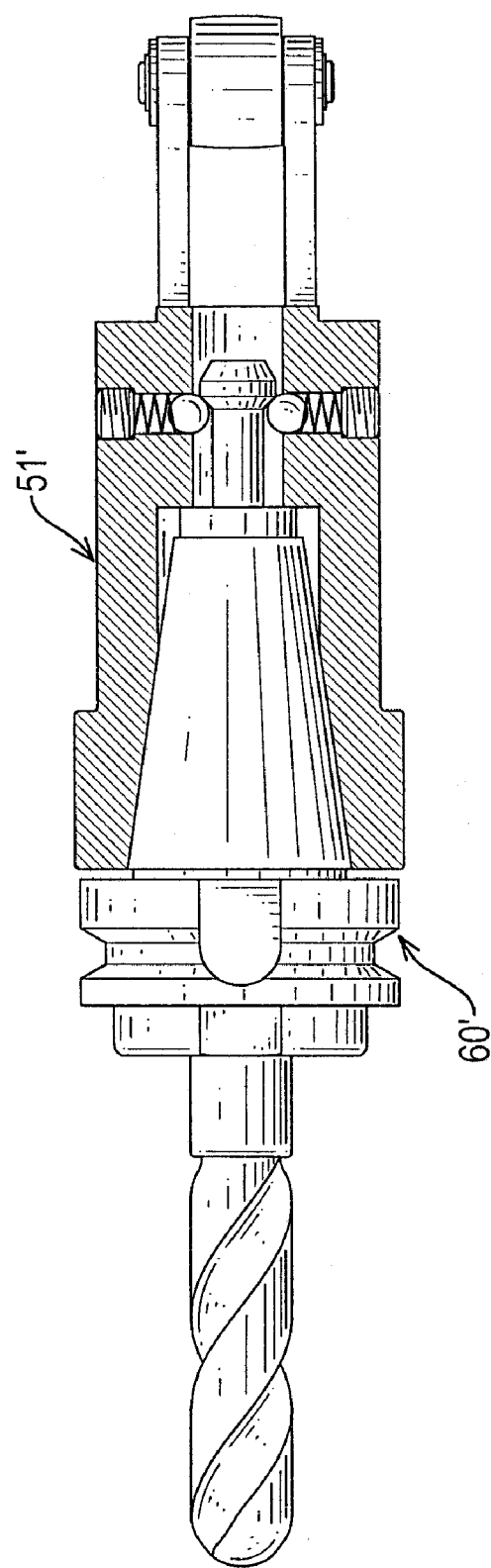
FIG. 9 is a side view in partial section of another conventional cutting tool holder in accordance with the prior art with a cutting tool.
Figure 10:
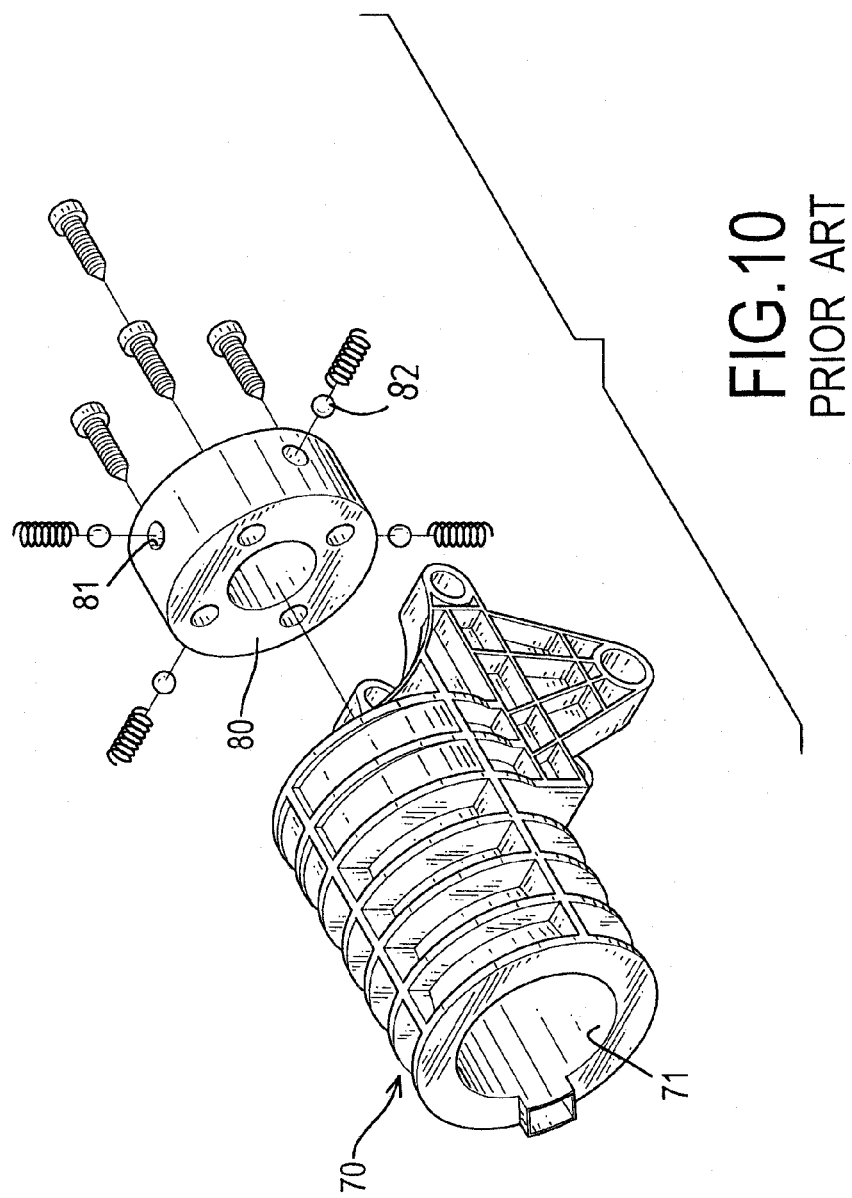
FIG. 10 is an exploded perspective view of another conventional cutting tool holder in accordance with the prior art.
Figure 11:
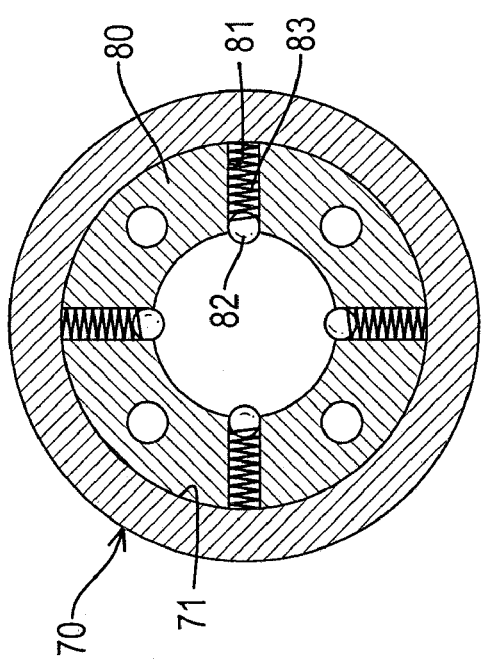
FIG. 11 is a rear view in partial section of the conventional cutting tool holder in FIG. 10.

With further reference to FIG. 6, in a fourth embodiment of the cutting tool container in accordance with the present invention, the base (21''') further comprises an annular recess (215'), the at least two positioning elements are three ball bearings (22''') and the locking element is a C-clip (24'''). The annular recess (215') is formed around the base (21') and corresponds to the positioning holes (212"). The diameter facing the through hole (210) of the positioning holes (212") is smaller than the diameter facing outside of the positioning holes (212"). The ball bearings (22''') are located in the positioning holes (212") and engage the annular recess (320, 320') of the seat (30) to securely yet releasably retain the seat (30) in the fastening device. The C-clip (24''') is located in the annular recess (215') of the base (21''') and presses against the ball bearings (22''') to keep the ball bearings (22''') from escaping the positioning holes (212").

The cutting tool holder as described has numerous advantages:
1. All the components of the fastening device are held together in advance. A complete mounted fastening device is easy to be mounted in the body.
2. When the cutting tool holder is mounted in the adapted machine and the user want to change the pull stud, the cutting tool holder does not have to be dismounted from the adapted machine. The user can only dismount the fastening device from the cutting tool holder and mounted another suitable fastening device.
3. When the fastening device is mounted in and dismounted from the body (10), the components such as the spring (23) and the ball bearing (22) will not separate because all the components of the fastening device are held together.
4. Because all the components of the fastening device are held together, to dismount the fastening device from the body is easy.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A cutting tool holder for a machining center comprising
a body having
    a proximal end;
    a distal end;
    a conical hole formed in the proximal end and having an opening and a bottom wherein the conical hole tapers smaller from the opening to the bottom;
    a containing recess formed in the distal end, corresponding to the conical hole and having a bottom face; and
    multiple screw holes formed in the bottom face of the containing recess;

a fastening device mounted in the containing recess and having
a base comprising
an inner surface;
an outer surface;
an annular wall;
a through hole formed through the base;
multiple fastening holes formed around the through hole and through the base;
multiple fasteners respectively extended into the fastening holes and the screw holes to hold the base and the body together; and
at least two positioning holes formed in the annular wall to communicate with the through hole and each of the at least two positioning holes having an inner opening and an outer opening;
at least two positioning elements respectively located in the at least two positioning holes; and
a locking element mounted around the base and holding the at least two positioning elements in position.

2. The cutting tool holder as claimed in claim 1, wherein the base further comprises an annular protrusion formed on the inner surface and around the through hole in the base and protruding to the conical hole in the body.

3. The cutting tool holder as claimed in claim 1, wherein
the at least two positioning holes in the base are four positioning holes, and the diameter of the inner opening of the positioning holes is smaller than the diameter of the outer opening of the positioning holes;
the at least two positioning elements are four ball bearings respectively located in the positioning holes; and
four springs located in the corresponding positioning holes and pressing against the corresponding ball bearings;
the locking element is a circular cover mounted around the base.

4. The cutting tool container as claimed in claim 1, wherein
the base further comprises an annular recess formed around the base and corresponding to the positioning holes;
the locking element is a C-clip located in the annular recess and having two ends; and
the at least two positioning element are two protrusions formed on the two ends of the C-clip, protruding in the at least two positioning holes.

5. The cutting tool container as claimed in claim 1, wherein
the base further comprises an annular recess formed around the base and corresponding to the positioning holes, and the diameter of the inner opening of the positioning holes is smaller than the diameter of the outer opening of the positioning holes;
the at least two positioning elements are three ball bearings respectively located in the positioning holes; and
the locking element is a C-clip located in the annular recess of the base and presses against the ball bearings.

* * * * *